United States Patent
Roberts

(10) Patent No.: US 9,860,473 B1
(45) Date of Patent: Jan. 2, 2018

(54) ELECTRONIC MONITORING SECURITY DEVICE SYNCHRONIZATION

(71) Applicant: SureView Systems, LLC, Tampa, FL (US)

(72) Inventor: Paul Roberts, St. Petersburg, FL (US)

(73) Assignee: Sureview Systems, LLC, Tampa, FL (US)

( * ) Notice: Subject to any disclaimer, the term of this patent is extended or adjusted under 35 U.S.C. 154(b) by 221 days.

(21) Appl. No.: 14/971,131

(22) Filed: Dec. 16, 2015

Related U.S. Application Data

(60) Provisional application No. 62/094,361, filed on Dec. 19, 2014.

(51) Int. Cl.
*H04N 5/44* (2011.01)
*H04N 7/18* (2006.01)

(52) U.S. Cl.
CPC ............... *H04N 5/44* (2013.01); *H04N 7/183* (2013.01)

(58) Field of Classification Search
USPC .......................................................... 348/143
See application file for complete search history.

(56) References Cited

U.S. PATENT DOCUMENTS

| | | | | |
|---|---|---|---|---|
| 7,983,835 | B2* | 7/2011 | Lagassey | G07C 5/008 340/907 |
| 9,654,648 | B2* | 5/2017 | Sharma | H04M 15/8061 |
| 9,654,649 | B2* | 5/2017 | Sharma | H04M 15/8061 |
| 9,674,372 | B2* | 6/2017 | Karnas | H04M 15/8061 |
| 9,716,799 | B2* | 7/2017 | Sharma | H04M 15/72 |
| 2013/0300873 | A1* | 11/2013 | Klopov | G08G 1/04 348/149 |
| 2015/0097961 | A1* | 4/2015 | Ure | G08B 5/223 348/159 |

* cited by examiner

*Primary Examiner* — Reza Aghevli
(74) *Attorney, Agent, or Firm* — Nicholas Pfeifer; Smith & Hopen, P. A.

(57) ABSTRACT

The present invention includes a security-monitoring platform (SMP) adapted to automatically synchronize with the monitored security systems and their respective electronic monitoring security devices. The SMP includes a synchronization module designed to communicate with the security systems using their respective application programming interfaces. The synchronization module retrieves the information for each electronic monitoring security device in each security system and determines whether the electronic monitoring security device information is known and up to date on the SMP. If an electronic monitoring security device has been added, removed, or modified, the synchronization module updates the SMP accordingly. The synchronization module automatically runs maintenance on the SMP to guarantee that the SMP can provide efficient and effective security measures.

12 Claims, 4 Drawing Sheets

ELECTRONIC MONITORING SECURITY DEVICE SYNCHRONIZATION

CROSS-REFERENCE TO RELATED APPLICATIONS

This nonprovisional application is a continuation of and claims priority to provisional application No. 62/094,361, entitled "Security Asset Synchronization," filed Dec. 19, 2014 by the same inventor.

BACKGROUND OF THE INVENTION

1. Field of the Invention

This invention relates, generally, to synchronizing electronic monitoring security devices to a security-monitoring platform. More specifically, it relates to the automated electronic monitoring security device synchronization for various security systems/devices monitored on a security-monitoring platform.

2. Brief Description of the Prior Art

Most buildings and facilities employ a number of security systems for protection. These security systems include, but are not limited to, video systems to provide a view of what is happening at the location, access control of doors to control who can access the location or areas within, intrusion detection (alarm panels) to detect intruders (for example motion detection sensors detecting body heat), audio systems to provide one-way or two-way audio communications, lone worker GPS-enabled devices with a panic button given for guards, and situational awareness systems to provide information outside of traditional alarm sources such as earthquake and weather warnings. Often, security systems are made by a number of manufacturers, and there may exist more than one at each location. For example, a building may have two different video systems, two different access control systems, and one intrusion system.

To enable efficient use of the various security systems, security-monitoring platforms (SMPs) are often employed to help monitor and control the various electronic monitoring security devices provided by the security systems. An electronic monitoring security device includes, but is not limited to any alarm source, video source, output, or audio source connected to any security system.

The SMP is designed to integrate several security systems into a single platform. As shown in FIG. 1, security systems 101, and in turn their electronic monitoring security devices 102-105, are in communication with SMP 107 using manufacturer's application programming interface (API) 106. Once connected, the SMP operator is capable of interacting with the particular electronic monitoring security devices 102-105 provided by each system 101 (i.e. receive alarms from the alarm devices 103, view live video from camera devices 102, control the outputs of output devices 104, and transmit/receive audio from audio devices 105).

More importantly, the SMP is adapted to integrate devices of different manufacturers, which are usually unable to directly communicate with each other. For example, if a building has an access control system (system using swipe cards for door locks) made by one manufacturer and a camera system made by a second manufacturer, the SMP integrates both of the systems and enables an operator to utilize the cameras and access control system as a single system. The SMP creates associations between the various devices to improve the functionality of the SMP and the ability of the operator to analyze the situation in a timely manner. For example, the SMP may identify a tripped alarm device and will present an associated video feed produced from a video device that has been previously determined to include the tripped alarm in the viewing frame. Additionally, the SMP may provide the operator with the ability to interact with other controllable systems in place, and associated with, the alarm device, such as controllable secondary cameras, door-operating devices, light operating device, etc.

Before the SMP can properly function, it must identify the available security systems and their respective electronic monitoring security devices. The security systems are installed and the operational information is stored in data store 108. In particular, the SMP needs to know a) the type of system (i.e. which manufacturer and model) and b) the connection details (i.e. the IP address, port, username, and password). Examples of operational information for different types of electronic monitoring security devices may include:

a) For alarm sources: the type and source number, such as "Door number 3" or "Input number 7".

b) For cameras: the input number, such as Camera number "2".

c) For outputs: the type and output number, such as "Relay number 6" and "Door Reader number 3".

d) For audio: the audio number, such as Intercom number "3".

Each electronic monitoring security device may also include a name such as "Front Door".

If the security system or its electronic monitoring security devices are modified in some way, then that change has to be reflected in the SMP. For instance, if a new door is added to an access control system (i.e. door number 5 called "back door"), then the corresponding operational information, such as the exemplary information above, must be digitized into an SMP-compatible format and made accessible to the SMP, such that the SMP is aware of the existence of the electronic monitoring security devices monitoring this new door. Similarly, if a camera is removed from a video system (such as camera number 3, labeled "front door") then the SMP must be updated, so that the SMP understands that camera 3 no longer exists. Currently, all of the operational information related to the security system and its electronic monitoring security devices must be manually entered into the SMP database by data entry user 110. Clearly, that can be a time consuming and monotonous task subject to human error. In addition, the person responsible for the update may fail to update the SMP in a timely manner, which could leave the secured property vulnerable to certain threats. Any resulting human error could be disastrous for persons or entities relying on the SMP to efficiently and accurately handle security needs. For example, an error infected SMP could fail to timely launch a necessary security response or fail to launch the response altogether resulting in undesirable consequences to persons or property being monitored by the electronic monitoring security devices.

Accordingly, what is needed is system and method to automatically synchronize electronic monitoring security devices between each security system and the SMP. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for system and method to automatically synchronize electronic monitoring security devices between each security system and a security-monitoring platform is now met by a new, useful, and nonobvious invention.

The novel invention includes a synchronization module in electronic communication with a security system and a security-monitoring platform (SMP). The synchronization module encapsulates an application programming interface for one or more security systems intended to operate in conjunction with the SMP and stores access information for each security system in a data store that is electronically linked to the SMP.

The synchronization module then automatically initiates a synchronization protocol. The synchronization protocol includes the following steps to synchronize the SMP with the security systems intended to operate in conjunction with the SMP. The data store is accessed and the security systems are identified based on the access information stored in the data store.

For each identified security system, an electronic communication is established between the SMP and the security system, and the electronic monitoring security devices currently employed by the security system are identified. The electronic connection is preferably established through the encapsulated application programming interface for the particular security system.

After identification of the electronic monitoring security devices employed by the security system, a series of steps are performed for each electronic monitoring security device. First, the synchronization module establishes whether the SMP is aware of the electronic monitoring security device employed by the security system. Responsive to a determination that the SMP is unaware of the electronic monitoring security device, the SMP is automatically updated to include the operational information of the electronic monitoring security device, thereby enabling the SMP to electronically communicate with the electronic monitoring security device.

If it is determined that the SMP is aware of the electronic monitoring security device, the present invention next determines whether the electronic monitoring security device has been changed. If the electronic monitoring security device, as operated in the security system, is not accurately reflected in the SMP, the operational information of the electronic monitoring security device in the SMP is updated accordingly.

An embodiment may include an operation for determining whether the SMP includes operational information for any electronic monitoring security devices not employed by one of the security systems intended to operate in conjunction with the SMP and removing that information if detected.

An embodiment may include disabling the electronic communication with a particular security system in the SMP when no electronic monitoring security devices are employed by the security system.

In an embodiment, the synchronization protocol is automatically initiated in a cyclical pattern.

An embodiment may also include detecting when the SMP encounters a monitoring error and automatically initiating the synchronization protocol upon the detection.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
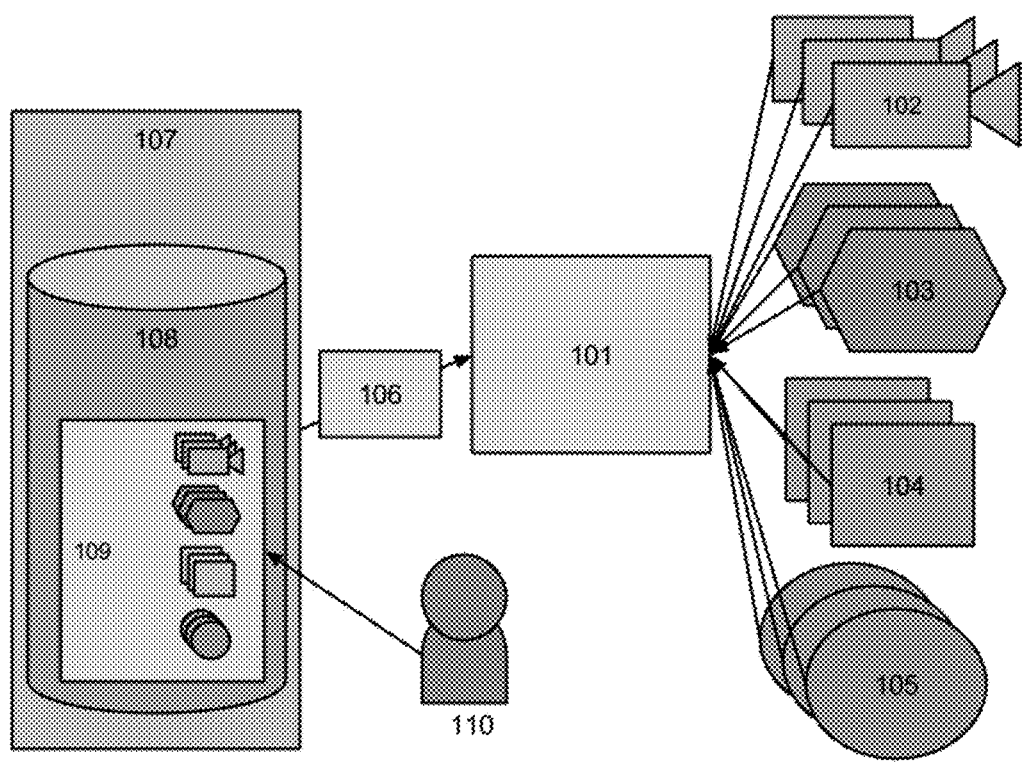
FIG. 1 is a schematic diagram illustrating the typical communication structure of a security-monitoring platform and a security system.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

The invention provides fully automatic synchronization of electronic monitoring security devices from security systems with a security-monitoring platform (SMP) to eliminate the laborious manual synchronization and maintenance previously necessary to input electronic monitoring security devices information into the SMP. An electronic monitoring security device refers to, inter alia, any alarm/alert source, video source, output, or audio source connected to a security system.

Typically, a security system includes several groupings of electronic monitoring security devices having distinct identifiers within the security system. Likewise, the SMP is designed to distinguish between each security system and/or their respective electronic security monitoring devices. For example, the SMP may group the security systems and/or their respective electronic monitoring security devices. The SMP is preferably configured to include groupings that mirror the groups in the security system. The SMP groups are mapped to the groups in the security system to provide easy integration and operation. When a particular security system lacks groups, the SMP may include a single group, encompassing every electronic monitoring security device for that particular security system, mapped to a corresponding SMP group.

Each security system 201 is self-contained and includes a system-specific application programming interface (API). The API for each security system is unique to that security system, but each API provides the necessary communicability to enable a user to control and utilize the security system. For example, an API can provide (1) a connection to web services inside the security system allowing a user to execute commands to query and control the security system's security devices, (2) a connection to the database of the security system, and/or (3) a proprietary connection through a software development kit (SDK) with functions allowing a user to query and control the security system's security devices.

The SMP automatically encapsulates each security system's API to provide the SMP operator with a uniform format for operating each security system. The encapsulation of each security system's API allows the SMP operator to control the security system's electronic monitoring security devices and perform functions, such as:
1) Connect (connect to the security system)
2) Get Cameras (get all the cameras on the security system)
   i) Get Cameras On Site/Device/Group 'X' (get all the cameras on a particular site, device, or 'grouping' within the security system)
3) Get Alarms (get all the alarms on the system)
   i) Get Alarms On Site/Device/Group 'X' (get all the alarms on a particular site, device, or 'grouping' within the security system)
4) Get Outputs (get all outputs on the system)
   i) Get Outputs On Site/Device/Group 'X' (get all the outputs on a particular site, device, or 'grouping' within the security system)
5) Get Audio Inputs and Outputs
   i) Get Audio Inputs and Outputs on Site/Device/Group 'X' (get all the audio inputs/output on a particular site, device, or 'grouping' within the security system)

Figure 2:
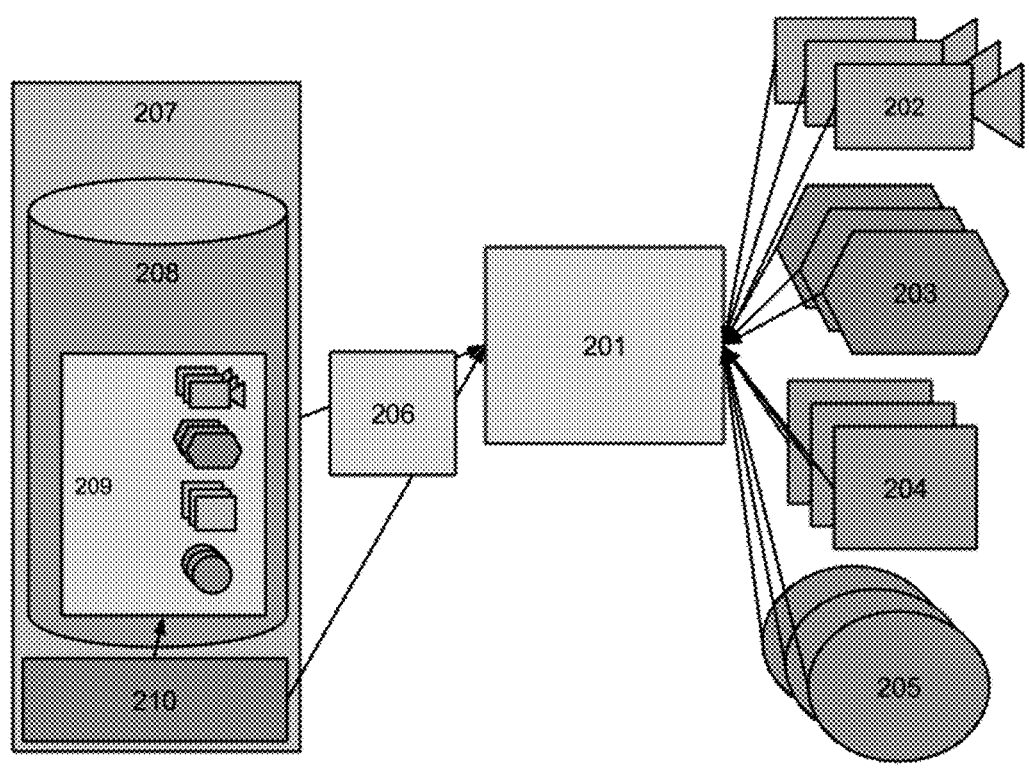
FIG. 2 is a schematic diagram of a certain embodiment of the present invention.

Referring to FIG. 2, SMP 207 is designed to integrate a plurality of security systems 201 securing, for example, a particular building or facility. SMP 207 improves the performance of every security system 201 monitoring the site by electronically associating certain electronic monitoring security devices 202-205 in one system with certain electronic monitoring security devices from another system. An exemplary result may be an alarm from one system causing a camera on another system to record the cause of the alarm.

For various reasons, electronic monitoring security devices 202-205 may be added, modified, and/or removed from security systems 201. As electronic monitoring security devices 202-205 are added to a particular system 201, the electronic monitoring security devices become available for use in that particular system resulting in the system electronically communicating with the electronic monitoring security devices. However, the SMP 207 must also be informed of the addition of a new electronic monitoring security device. As shown in FIG. 1, current systems require operator 110 to manually install the new electronic monitoring security device information onto SMP 107. Manual synchronization maintenance is not only time consuming and monotonous, but is also subject to a high risk of user error, which is often associated with time-consuming monotonous tasks. The present invention eliminates this problem by providing automated SMP synchronization.

Referring now to FIG. 2, the present invention includes an automated synchronization module 210 to eliminate the necessary manual synchronization of electronic monitoring security devices. Synchronization module 210 automatically initiates a synchronization protocol in preferably a cyclical pattern. For example, synchronization module 210 may initiate the protocol every twenty-four hours to maintain operational efficiency. In a certain embodiment, an operator may determine when and how often the synchronization protocol is run. Moreover, the SMP's graphic user interface may include an operator with a manual trigger to run the synchronization protocol when desired.

Figure 3A:
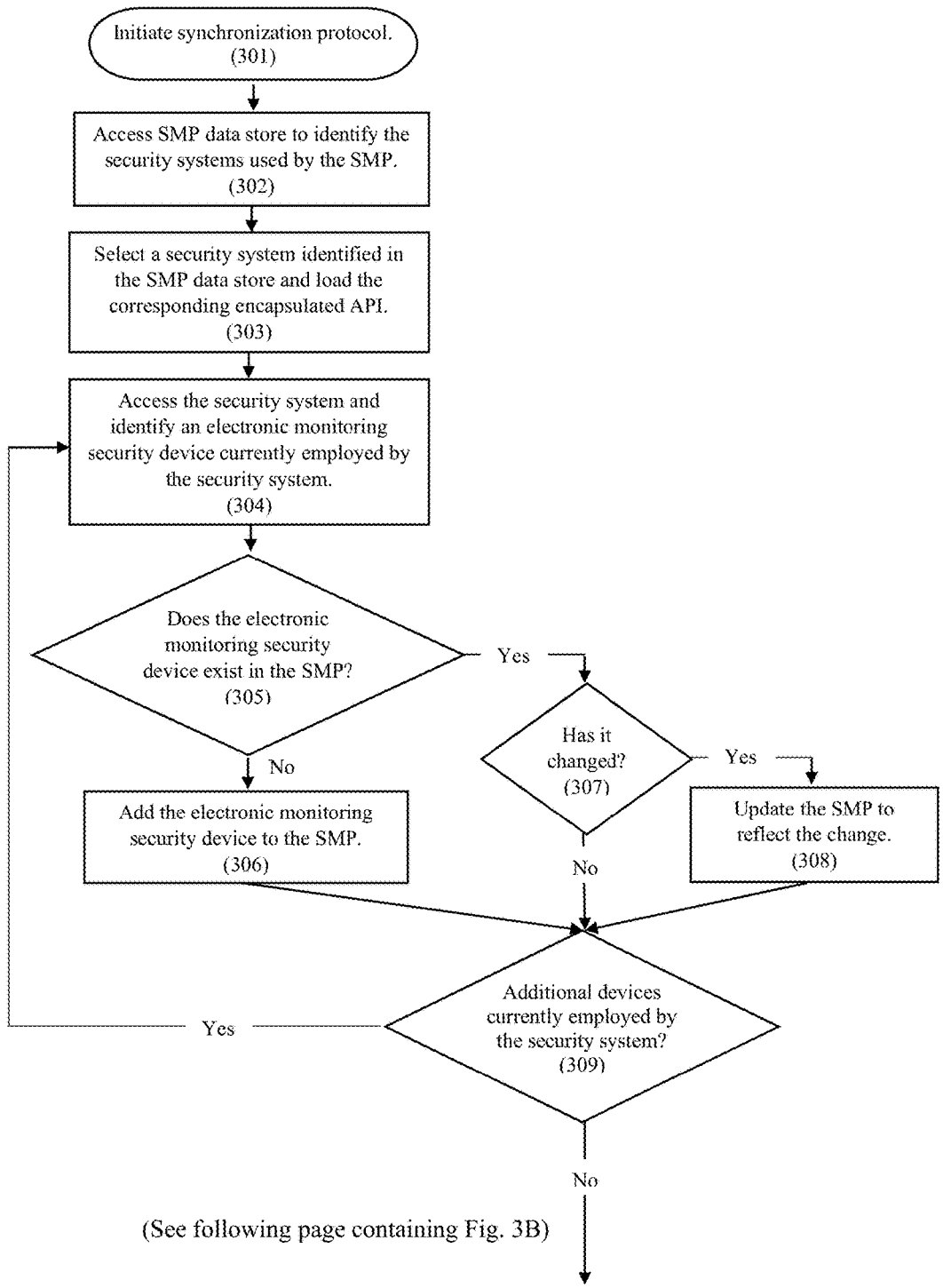
FIG. 3A is a partial flowchart of a certain embodiment of the present invention.

Referring now to FIG. 3A, an embodiment of the present invention includes the synchronization module initiating a synchronization protocol as exemplified in step 301. The synchronization module accesses the SMP data store to identify the security systems employed on the SMP (step 302). The synchronization module then selects one of the security systems identified in the SMP data store and loads the corresponding encapsulated API (step 303). The synchronization model accesses the security system using the encapsulated API and identifies each electronic monitoring security device employed by the security system (step 304). For each electronic monitoring security device, the present invention determines whether the SMP is aware of the existence of the identified electronic monitoring security device (step 305). If the electronic monitoring security device is unknown to the SMP, the SMP stores the operational information related to the electronic monitoring security device for future use (step 306).

The operational information fetched and stored by the SMP is the information needed by the SMP to access and control the electronic monitoring security device. In an embodiment, the invention includes a step of modifying the operational information from the security system format to a specific SMP format to allow the SMP to use the operational information. This information varies depending on the type of electronic monitoring security device. Some non-limiting examples are provided below:
1) Cameras:
   a) Name of the camera (i.e. 'front door camera')
   b) Source number needed when connecting to it (i.e. the front door camera is camera number '5' on the video system)
2) Audio Inputs and Outputs:
   a) Name of the input/output (i.e. 'front door intercom')
   b) Source number needed when connecting to it (i.e. the front door intercom is audio number '3' on the audio system)
3) Outputs:
   a) Name of the output (i.e. 'gate control')
   b) Source number needed when connecting to it (i.e. the gate control output is output number '7' on the output system)

4) Alarm Sources:
   a) Name of the alarm source (i.e. 'front door')
   b) Source number that will be sent with the alarm to identify the source (i.e. the front door is door number '1' on the access control system)
   c) Optionally, a list of event types that the source can generate (i.e. the front door can generate 'door forced open', 'door held open', 'access denied', 'access granted', etc.)

If the electronic monitoring security device is known, but has been altered, the SMP is updated to reflect the updated in the electronic monitoring security device (steps 307-308). For example, a video monitoring security system may include several cameras monitoring the doors of a facility. Camera input number 1 may originally have been monitoring the front door and was therefore named "Front Door." If the camera is relocated and renamed to "Delivery Door" in the video monitoring security system, the synchronization module will automatically update the SMP to capture the change in location and name of the camera connected through input number 1. The updated SMP renames the camera input 1 in the SMP so that the operator understands that camera input 1 is now monitoring the delivery door.

Following any updates to the SMP or in the event that the electronic monitoring security device is unchanged, the synchronization model searches the security system for any other electronic monitoring security device employed by the security system (steps 307, 309). The synchronization protocol reverts to step 304 if additional electronic monitoring security devices are employed by the security system and have not been previously examined by the synchronization module during the current synchronization protocol (step 309).

Figure 3B:
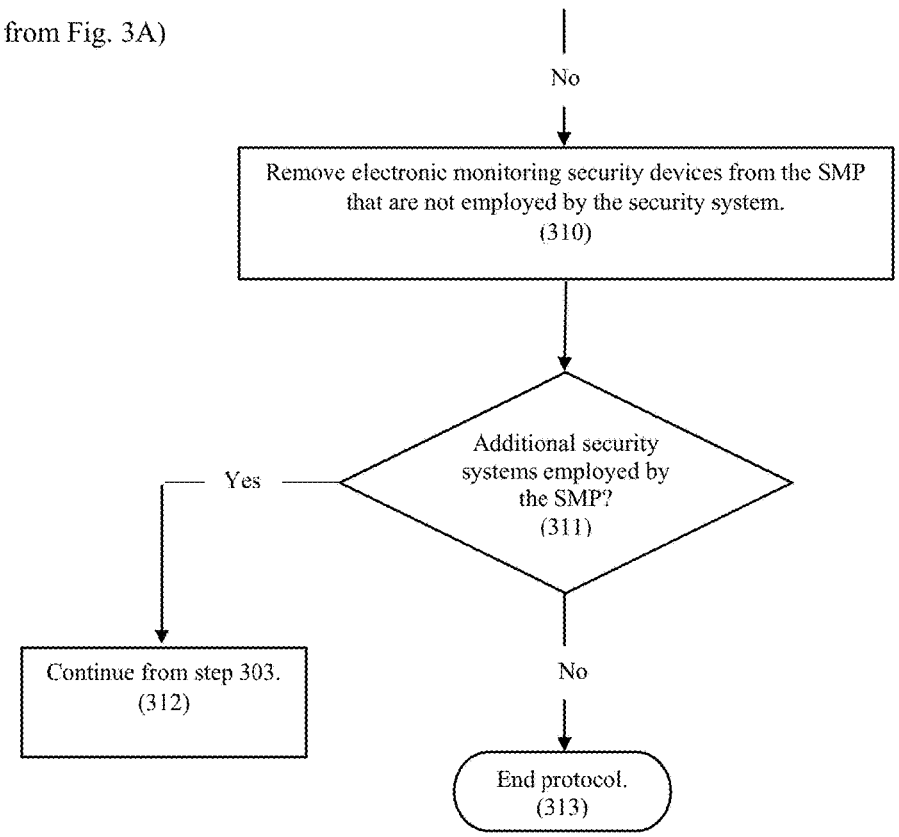
FIG. 3B is the remaining portion of the flowchart in FIG. 3A.

Referring now to FIG. 3B, if every electronic monitoring security device employed by the security system has been analyzed during the currently running synchronization protocol, the synchronization module checks whether the SMP includes operational information for an electronic monitoring security device not currently employed by a security system. Any operational information associated with electronic monitoring security devices that are not currently employed by a security system are removed from the SMP (step 310). As an illustration, the synchronization module may access the groups on the SMP to determine whether each group stored on the SMP corresponds to the security systems and/or the electronic monitoring security devices currently employed by the security systems. In the event that the SMP includes operational information for an electronic monitoring security device not currently employed by a security system, that operational information is removed from the SMP.

The synchronization module then determines whether the SMP operates in connection with any additional security systems that have not been synchronized with the SMP (step 311). The synchronization module reverts to step 303 upon a determination that the SMP employs additional security systems that have not been synchronized with the SMP (step 312). The synchronization protocol ends if every security system currently employed by the SMP has been synchronized.

In a certain embodiment, the sync service runs in a predetermined cyclical manner to continuously keep the SMP up to date with the available electronic monitoring security devices on each security device.

In a certain embodiment, the sync service may be adapted to detect when an error has occurred in the monitoring of a certain electronic monitoring security device or security system and automatically initiate the synchronization protocol to find and solve the error. A monitoring error includes, inter alia, failure to connect the SMP to the security system and failure to retrieve electronic monitoring security device information after establishing a connection between the SMP and the security systems. If an error occurs in the completing the synchronization protocol, the error is logged for future maintenance.

In a certain embodiment, the sync protocol may include an additional step of disabling a security system in the SMP when no electronic monitoring security devices are found on the security system. This embodiment may also continuously check the disabled security system to determine whether any electronic monitoring security devices have been added to the system, in which case it could re-activate the security system on the SMP.

Hardware and Software Infrastructure Examples

The present invention may be embodied on various computing platforms that perform actions responsive to software-based instructions and most particularly on touch-screen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

Glossary of Claim Terms

Application Programming Interface: is a software intermediary enabling application programs to interact with each other and share data.

Data Store: is any hardware or software capable of storing information.

Electronic Monitoring Security Device: is any monitoring device operating as part of a security system, including, but not limited to, alarm source, video source, output, or audio source.

Encapsulate: is an action to alter a particular computer code to operate in conjunction with another system or program.

Operational Information: is descriptive information of the electronic monitoring security device, such as the name of the electronic monitoring security device, and its connection information with respect to the security system.

Security System: is any system providing security measures.

Security-Monitoring Platform: is a system in communication with one or more security systems designed to allow an operator to monitor and sometimes control the security system and its electronic monitoring security devices.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A computer-implemented method for automatically synchronizing electronic monitoring security devices with a security-monitoring platform comprising executing on a processor the steps of:
    encapsulating an application programming interface for one or more security systems intended to operate in conjunction with the security-monitoring platform;
    storing access information for each security system in a data store that is electronically linked to the security-monitoring platform;
    automatically initiating a synchronization protocol, wherein the synchronization protocol includes the steps of:
        accessing the data store;
        identifying each security system associated with the stored access information in the data store;
        for each security system:
            establishing an electronic communication between the security-monitoring platform and the security system through an encapsulated application programming interface associated with the security system;
            accessing the security system to identify the electronic monitoring security devices employed by the security system;
            for each electronic monitoring security device employed by the security system:
                determining whether the security-monitoring platform is aware of the electronic monitoring security device;
                responsive to a determination that the security-monitoring platform is unaware of the electronic monitoring security device, automatically incorporating operational information of the electronic monitoring security device into the security-monitoring platform, thereby enabling the security-monitoring platform to electronically communicate with the electronic monitoring security device;
                responsive to a determination that the security-monitoring platform is aware of the electronic monitoring security device, determining whether the operational information of electronic monitoring security device has been changed; and
                responsive to a determination that the operational information of the electronic monitoring security device has been changed, modifying the operational information of the electronic monitoring security device in the security-monitoring platform to reflect the change.

2. The computer-implemented method of claim 1, further including:
    determining whether the security-monitoring platform includes operational information for any electronic monitoring security devices not currently employed by one of the security systems intended to operate in conjunction with the security-monitoring platform; and
    removing any operational information existing in the security-monitoring platform, which is not currently employed by one of the security systems intended to operate in conjunction with the security-monitoring platform.

3. The computer-implemented method of claim 1, further including disabling the electronic communication with the security system in the security-monitoring platform when no electronic monitoring security devices are currently employed by the security system.

4. The computer-implemented method of claim 1, wherein the synchronization protocol is automatically initiated in a cyclical pattern.

5. The computer-implemented method of claim 1, further including detecting when the SMP encounters a monitoring error and automatically initiating the synchronization protocol.

6. A computer-implemented method for automatically synchronizing electronic monitoring security devices with a security-monitoring platform comprising executing on a processor the steps of:

automatically initiating a synchronization protocol, wherein the synchronization protocol includes the steps of:

accessing a data store that is in digital communication with the security-monitoring platform, wherein the data store includes access information for each security system intended to operate in conjunction with the security-monitoring platform;

identifying each security system associated with the stored access information in the data store;

for each security system:

establishing an electronic communication between the security-monitoring platform and the security system through an encapsulated application programming interface associated with the security system;

accessing the security system to identify the electronic monitoring security devices employed by the security system;

for each electronic monitoring security device employed by the security system:

determining whether the security-monitoring platform is aware of the electronic monitoring security device; and responsive to a determination that the security-monitoring platform is unaware of the electronic monitoring security device, automatically incorporating operational information of the electronic monitoring security device into the security-monitoring platform, thereby enabling the security-monitoring platform to electronically communicate with the electronic monitoring security device.

7. The computer-implemented method of claim 6, further including:

determining whether the security-monitoring platform includes operational information for any electronic monitoring security devices not employed by one of the security systems intended to operate in conjunction with the security-monitoring platform; and removing any operational information existing in the security-monitoring platform, which is not employed by one of the security systems intended to operate in conjunction with the security-monitoring platform.

8. The computer-implemented method of claim 6, further including disabling the electronic communication with the security system in the security-monitoring platform when no electronic monitoring security devices are employed by the security system.

9. The computer-implemented method of claim 6, further including encapsulating an application programming interface for one or more security systems intended to operate in conjunction with the security-monitoring platform.

10. The computer-implemented method of claim 6, further including storing access information for each security system in the data store that is electronically linked to the security-monitoring platform.

11. The computer-implemented method of claim 6, further including, responsive to a determination that the security-monitoring platform is aware of the electronic monitoring security device, determining whether the operational information of the electronic monitoring security device has been changed.

12. The computer-implemented method of claim 11, further including, responsive to a determination that the operational information of the electronic monitoring security device has been changed, modifying the operational information of the electronic monitoring security device in the security-monitoring platform to reflect the change.

* * * * *